United States Patent
Ryoke et al.

[11] Patent Number: 5,573,444
[45] Date of Patent: Nov. 12, 1996

[54] POLISHING METHOD

[75] Inventors: Katsumi Ryoke; Keisuke Yamada; Masaaki Fujiyama, all of Kanagawa, Japan

[73] Assignee: Fuji Photo Film Co., Ltd., Kanagawa, Japan

[21] Appl. No.: 263,728

[22] Filed: Jun. 22, 1994

[30] Foreign Application Priority Data

Jun. 22, 1993 [JP] Japan ................... 5-150380

[51] Int. Cl.$^6$ ...................... B24B 1/00
[52] U.S. Cl. ............... 451/28; 451/59; 451/533; 451/539
[58] Field of Search ............... 451/28, 41, 56, 451/59, 168, 170, 526, 533, 539

[56] References Cited

U.S. PATENT DOCUMENTS

| | | | |
|---|---|---|---|
| 2,581,414 | 1/1952 | Hochberg | 241/22 |
| 2,855,156 | 10/1958 | Hochberg et al. | 241/22 |
| 4,388,368 | 1/1983 | Hibino et al. | 428/336 |
| 4,656,790 | 4/1987 | Mukai et al. | 451/28 |
| 4,999,953 | 3/1991 | Kinugawa et al. | 451/59 |
| 5,036,629 | 8/1991 | Ishikuro et al. | 451/59 |
| 5,042,920 | 8/1991 | Yoshino et al. | 359/68 |
| 5,089,330 | 2/1992 | Sato et al. | 428/323 |
| 5,209,027 | 5/1993 | Ishida et al. | 451/59 |

FOREIGN PATENT DOCUMENTS

| | | |
|---|---|---|
| 56-26890 | 6/1981 | Japan . |
| 57-123532 | 8/1982 | Japan . |
| 59-116926 | 7/1984 | Japan . |
| 59-142741 | 8/1984 | Japan . |
| 59-165239 | 9/1984 | Japan . |
| 60-44264 | 3/1985 | Japan . |
| 61-129731 | 6/1986 | Japan . |
| 62-37451 | 8/1987 | Japan . |
| 3-131463 | 6/1991 | Japan . |
| 4-315566 | 11/1992 | Japan . |
| 5-77153 | 3/1993 | Japan . |

*Primary Examiner*—Robert C. Watson
*Assistant Examiner*—Thomas W. Lynch
*Attorney, Agent, or Firm*—Sughrue, Mion, Zinn, Macpeak & Seas

[57] ABSTRACT

A surface of a member having intrinsic projections thereon is polished to remove the intrinsic projections. An abrasive tape is formed of a substrate and an abrasive layer formed thereon. The abrasive layer primarily contains abrasive grains and a binder. The abrasive tape and the member are slid in substantially opposite directions with the abrasive layer and the surface of the member kept in contact with each other.

2 Claims, 1 Drawing Sheet

POLISHING METHOD

BACKGROUND OF THE INVENTION

1. Field of the Invention

This invention relates to a polishing method for removing intrinsic projections on the surface of a member such as a color filter for a liquid crystal display of STN type, TFT type or the like.

2. Description of the Prior Art

A color filter for a liquid crystal display which recently has come into wide use for various displays is generally manufactured by pigment dispersion method, dyeing method, printing method or the like. If defects such as projections exist on the surface of the color filter, the function of a transparent electrode of ITO (indium oxide-tin oxide composite) or the like is damaged when it is mounted on the color filter, which results in unsatisfactory functioning of the color filter. However even if the color filter is produced at a dust level of class 10 to 10000 (Federal specification), the projections on the color filter cannot be completely removed. Such defects on the color filter causes a color shading, a color shift, a dislocation of the filter and/or a pattern abnormality, and the the liquid crystal display cannot function even if a transparent electrode is mounted thereon. Thus the defects on the color filter lowers the yield and has been a great problem in production of the liquid crystal display.

More particularly, the liquid crystal display is manufactured by laminating a color filter a transparent electrode, picture element electrodes, a transistor layer and the like between a pair of glass electrodes with a liquid crystal layer disposed at the center. When the color filter has projections, the projections can break the transparent electrode upon lamination, which can result in a color defect.

Since these projections are "intrinsic projections" which are formed during formation of a filter film on a glass substrate by coating, printing or the like due to coagulation of dispersions or printing ink and are not simple deposits, it is difficult to wipe off the projections.

Various polishing methods have been used to smooth an uneven surface of a member depending on the material of the member, the application thereof, the performance requirement thereof and the like. However generally, an abrasive member is pressed against the surface of the member to be smoothed and slid along the surface. As the abrasive member, an abrasive tape comprising an abrasive layer formed on a flexible base is in wide use since it can slide even along a surface having an irregular contour keeping a close contact therewith.

However in the case of a color filter for a liquid crystal display, when the color filter is polished by simply sliding the abrasive tape along its surface, not only the intrinsic projections cannot be sufficiently removed but also the surface of the color filter is scratched and cuttings can scratch the surface of the color filter or can adhere to the surface of the same to cause other problems.

For example, though there are disclosed various polishing machines using various abrasive tapes in Japanese Unexamined Patent Publication Nos. 3(1991)-131463, 4(1992)-315566, 5(1993)-77153, 60(1985)-44264 and the like, polishing by these machines can result in contamination of the surface of the color filter due to the composition of the abrasive tape and/or in scratches on the surface of the color filter due to cuttings going between the abrasive tape and the color filter.

SUMMARY OF THE INVENTION

In view of the foregoing observations and description, the primary object of the present invention is to provide a polishing method which can remove intrinsic projections from a surface of a member without scratching the surface.

More particularly the object of the present invention is to remove intrinsic projections from the surface of a color filter for a liquid crystal display with a high efficiency, thereby improving the yield in production of liquid crystal displays.

In accordance with the method of the present invention, an abrasive tape having an abrasive layer primarily containing abrasive grains and a binder and formed on a substrate and a member having a surface to be polished are slid in substantially opposite directions with the abrasive layer and the surface of the member kept in contact with each other, thereby grinding off intrinsic projections on the surface.

The "intrinsic projections" are projections which are formed from inside a member during production of the member and does not include foreign matters deposited on the member after production thereof.

DETAILED DESCRIPTION OF THE INVENTION

Figure 1:
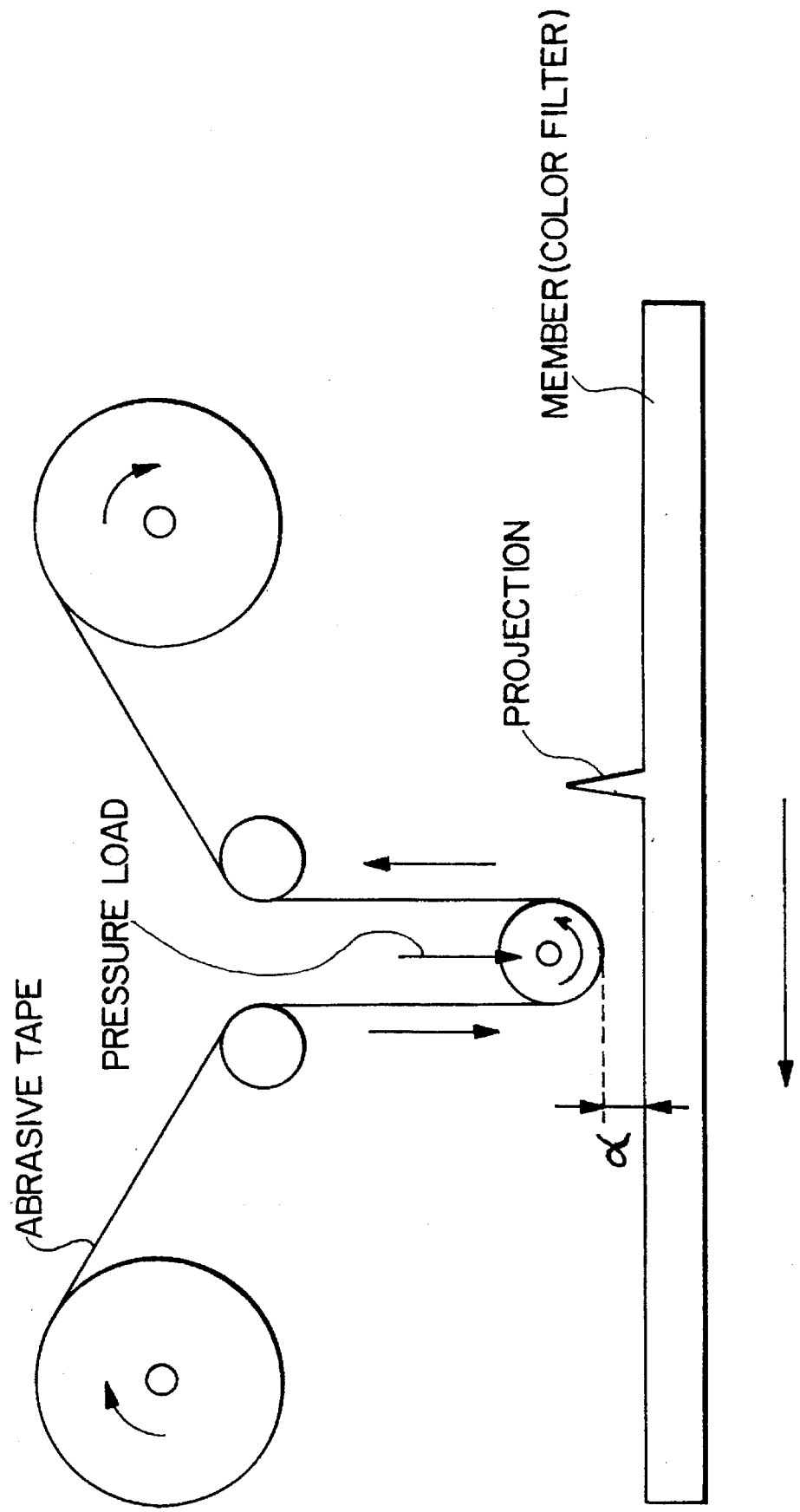
FIG. 1 is a cross-sectional view of an apparatus used to perform the polishing method of the present invention.

In accordance with the method of the present invention, by sliding the abrasive tape and the member in opposite directions, the intrinsic projections can be removed without scratching the surface of the member. That the abrasive tape and the member are slid in opposite directions is that both the abrasive tape and the member are moved in opposite directions in substantially horizontal contact with each other. The angle between the lines of movements of the abrasive tape and the member to be polished need not be about 180°. It is important that the abrasive tape and the member to be polished are both moved and their movements are substantially in opposite directions.

It is presumed that when the abrasive tape and the member are moved in opposite directions, the frictional resistance therebetween is increased as compared with when they are moved in the same direction with the stress concentrated on the intrinsic projections, whereby the intrinsic projections can be effectively removed.

Since the intrinsic projections are integrally fixed in the film of the surface to be polished, they are very difficult to remove by conventional methods for removing deposits on a surface without scratching the surface such as air-blowing, wiping or the like. It is presumed that by moving the abrasive tape and the member to be polished in opposite directions, cuttings are removed simultaneously with polishing and accordingly the intrinsic projections can be removed without scratching the surface unlike conventional methods where projections on the color filter are cut off with a knife, a razor blade or the like.

As the binder resin for the abrasive layer of the abrasive tape which can be used to carry out the method of the present invention, rigid resins such as vinyl chloride resins, nitrocellulose resins, polyester resins, epoxy resins and the like which are larger than 400 Kg/mm$^2$ in Young's modulus in dry film state as measured with a stress-strain ratio measuring appratus can be used. Further non-rigid resins such as urethane resins which are not larger than 300 Kg/mm$^2$ in Young's modulus in dry film state as measured with a stress-strain ratio measuring appratus also can be used. When a hardener is used together with the binder resin, a mechanically strong abrasive layer can be obtained. A preferable hardener is polyisocyanates.

Though may be applied to any member to be polished, the method of the present invention can be effectively applied to polish a color filter for a liquid crystal display and to finish-polish a magnetic head or a photosensitive drum for a copying machine. The method of the present invention can remove intrinsic projections on the surface of these members.

Among these members, a color filter for a liquid crystal display having intrinsic projections of synthetic resin is most effectively polished by the method of the present invention. That is, by use of a flexible abrasive tape, the intrinsic projections can be solely removed without cutting the other part.

The color filter for the liquid crystal display is generally manufactured by pigment dispersion method, dyeing method, printing method, electrodeposition or the like and comprises alternate layers of dispersions of red, green and blue pigments or dyes in synthetic resin formed on a glass substrate in thickness of 1 to 3 μm. The minimum width is about 20 μm and as the synthetic resin, acrylic resins, polyimide resins, gelatins and the like may be used. The term "a color filter for liquid crystal display" sometimes denotes such a color filter on which an ITO film transparent electrode.

The intrinsic projections on the surface of the color filter adversely affects opposed electrodes (ITO), an orientation film, enclosed liquid crystal and the like which are mounted on the color filter during production of a liquid crystal display and causes point defect, line defect, irregularities in display, in-surface shortcircuiting or the like. Thus by removing the intrinsic projections in accordance with the present invention, deterioration of yield in production of liquid crystal displays due to the intrinsic projections can be prevented.

In order to remove intrinsic projections by the method of the present invention, the hardness of the surface layer of the abrasive tape must be suitably controlled.

That is, the hardness of the surface of the abrasive layer of the abrasive tape must be selected according to the physical properties of the resin material of the member to be polished or the layer to be polished and/or the height and/or shape of the intrinsic projections. However it is generally preferred that the Young's modulus of the abrasive layer in the longitudinal direction of the abrasive tape be in the range of 20 to 400 kg/mm$^2$.

In order to facilitate control of the hardness of the abrasive layer, it is preferred that the binder resin in the abrasive layer be composed of aforesaid rigid resins, non-rigid resins and polyisocyanates in a particular proportion. As the rigid resin, vinyl chloride resins are preferable and as the non-rigid resins, urethane resins are preferable. The proportion of vinyl chloride resins: urethane resins: polyisocyanates is preferably 1 to 10:70 to 95:5 to 40 by weight, and more preferably 1 to 5:65 to 89:5 to 30 by weight.

When the proportion of these resins are in the range described above, a film excellent in stretchability and toughness can be obtained since the rigid resin content and polyisocyanate (functions as a crosslinking agent) content are small, whereby abrasive grains can be prevented from dropping off the abrasive layer and cuttings can be held on the abrasive layer. Accordingly, the hardness of the abrasive layer can be easily controlled to meet the aforesaid conditions.

Though it is preferred that a three-component system including vinyl chloride resin be used as the binder resin for the abrasive layer from the viewpoint of preventing the abrasive grains dropping off and keeping the hardness of the abrasive layer within the aforesaid range, it is preferred that no vinyl chloride resin exists in the binder resin when corrosion of electrodes due to generation halogen gas is taking into account. Accordingly it is important that the vinyl chloride resin content is 10% by weight at most.

Further since vinyl chloride resins generate halogen gas by change with age and accordingly when polishing tailings are left on the color filter, corrosion of ITO can be caused. Accordingly, the binder may be composed of urethane resins and polyisocyanates without vinyl chloride resin.

In this case, the proportion of urethane resins: polyisocyanates is preferably 60 to 95:5 to 40 by weight and more preferably 65 to 90:10 to 35 by weight. In this case, though the hard resin content is zero, crosslinking reaction takes place between OH group of polyurethane and NCO group of polyisocyanate, and it can be expected that a sufficient hardness of the coating film can be obtained by the three-dimensional crosslinking.

The method of the present invention will be described in more detail hereinbelow with respect to a color filter for a liquid crystal display, as an example, to which the method of the present invention can be best applied. However the present invention can be applied to any member so long as it has intrinsic projections.

In the polishing method of the present invention, the relative speed at which the member to be polished and the abrasive tape are slid in opposite directions relative to each other is important and is generally in the range of 10 to 6000 mm/sec. Preferably the relative speed is in the range of 30 to 5000 mm/sec and more preferably in the range of 40 to 4000 mm/sec.

When the relative speed is lower than 10 mm/sec, it becomes difficult to remove the intrinsic projections and when it is higher than 6000 mm/sec, the surface to be polished becomes apt to be scratched.

The speed of the member to be polished or the abrasive tape depends on the material and/or shape of the member, the stiffness of the abrasive tape and the like and cannot be determined by itself.

When the abrasive tape is pressed against the surface to be polished by a pressing roll (e.g., a hard roll of steel) which pushes the abrasive tape toward the surface from the side of the abrasive tape opposite to the abrasive layer at the portion where the abrasive layer and the surface are in contact with each other, the height of the abrasive tape relative to the member to be polished fluctuates, whereby the intrinsic projections cannot be cut at uniform level and the flatness of the surface cannot be kept good. In this case, it is necessary to keep constant the height of the abrasive tape relative to the member at 1 to 5μ by a jig.

The diameter of the pressing roll should be in the range of 5 to 600 mmφ, preferably in the range of 5 to 100 mmφ, and more preferably in the range of 5 to 38 mmφ. The pressing roll should be not larger than 290 mm in the width of the pressing portion at which it presses the side of the abrasive tape opposite to the abrasive layer, preferably not larger than 100 mm and more preferably not larger than 50 mm.

It is preferred that the pressing roll be formed of metal or rubber since with such a roll soft projections can be surely caught and cut though hard projections large in resistance to tension can be cut from the base thereof. Such a problem related to the hard projections can be suppressed by providing a rubber back roll.

As the metal for forming the pressing roll, stainless steel, Cr-plated stainless steel and the like are preferable. Preferably the pressing roll is a right cylinder or a drum (tapering from the center portion toward opposite end surfaces) in shape.

As the rubber for forming the roll, those having a Shore hardness of 20 to 100 are preferable, and preferably the rubber roll is a right cylinder or a drum (tapering from the center portion toward opposite end surfaces) in shape.

When the pressing roll is an air pressure roll, it is preferred that the abrasive tape be pressed against the surface to be polished at 1 to 35 Kg/cm$^2$. When the pressure is not higher than 10 Kg/cm$^2$, it is preferred that the surface be polished a plurality of times.

The air pressure roll presses the abrasive tape against the surface to be polished under the pressure of pressurized air discharged through a slit nozzle, and it is preferred that the air pressure roll be applied to the abrasive tape from below so that cuttings do not fly over the surface of the member to be polished.

When carrying out the method of the present invention, the pressing load per unit segment (12.5 mm) is generally 5 to 500 g, and preferably 50 to 300 g.

Further it is preferred that the member be positioned so that the surface to be polished faces downward and the abrasive layer of the abrasive tape be brought into contact with the surface to be polished from below, whereby cutting powder is prevented from flying over the member to be polished to contaminate it.

The abrasive grains contained in the abrasive layer of the abrasive tape which is employed to carry out the method of the present invention should in the range of 0.05 to 1 μm in the mean particle size, and preferably in the range of 0.05 to 0.1 μm. When the mean particle size of the abrasive grains is smaller than 0.05 μm, the projections cannot be effectively removed and it takes a long time to polish the surface. When the mean particle size of the abrasive grains is larger than 1 μm, the surface can be scratched.

Further when the abrasive tape is slid along the color filter to remove the intrinsic projections thereon, the color filter can be damaged by static electrification, and accordingly it is preferred that the abrasive layer contains as an antistatic agent carbon black having a mean grain size of 5 to 100 nm, preferably 10 to 90 nm and more particularly 15 to 80 nm.

When the mean grain size of the carbon black is too small, the abrasive grains cannot be uniformly dispersed and kneaded, and the smoothness of the film surface is deteriorated due to coagulation of grains. When the mean grain size is too large, the electric resistance is increased and the surface of the abrasive layer becomes rough though the abrasive grains can be uniformly dispersed and kneaded.

No limitation is imposed on the abrasive tape employed in the present invention, but any of known abrasive tapes can be used. However, it is preferred that the binder component of the abrasive layer, the mean gain size of the abrasive grains and the carbon black content of the abrasive layer be selected as described above.

In the case of the color filter, the intrinsic projections which can be cut by the polishing method of the present invention are 5 to 100 μm in height and 1 to 1000 μm in diameter. These intrinsic projections are cut to a height of not larger than 4 μm as measured from the center line of the surface roughness of the color filter.

More particularly the abrasive tape is fed out from a supply reel and the abrasive tape is brought into contact with the surface to be polished of the color filter while applying a back tension to the abrasive tape and moving the abrasive tape and the color filter in opposite directions. The abrasive tape feed rate is, for instance, 10 cm to 1000 cm/min. Preferably the abrasive tape is oscillated in a direction crossing the direction of feed of the abrasive tape, for instance at 0 to 10 mm/sec. That is, the color filter is moved in the transverse direction by 0 to 5 mm each time abrasive tape is fed by 10 mm. Otherwise the color filter may be slid obliquely. The abrasive tape is taken up around a take-up reel under a tension of 5 to 500 g per a width of 10 mm.

As nip rolls for supporting the abrasive tape, it is preferred that metal rolls or rubber roll described above be used though various types of rolls can be used. When a drive mechanism for moving up and down the nip rolls is operated, it is preferred that the nip rolls be moved up and down while applying a tension to the abrasive tape. Further preferably the abrasive tape has a width larger than that of the nip rolls.

The abrasive tape employed for carrying out the method of the present invention comprises a flexible substrate and a coating layer which is formed on the flexible substrate and primarily contains fine abrasive grains and a binder.

Any of vinyl chloride resins which are known for the binder resin can be used as the binder resin for the abrasive tape employed in the present invention.

For example, a vinyl chloride-vinyl acetate-vinyl alcohol copolymer, a vinyl chloride-vinyl acetate copolymer, a vinyl chloride-vinyl alcohol copolymer, a vinyl chloride-vinylidene chloride copolymer, a vinyl chloride-acrylonitrile copolymer and the like can be used. Among them, those having —(CHClCH$_2$)$_n$—(CHXCH$_2$)$_m$— (wherein X represents a polar group such as —SO$_3$Na, —SO$_3$H, —PO$_4$H or the like) as a base unit are preferred in view of the strength of the abrasive layer and dispersion of the abrasive grains.

Among the vinyl chloride resins, MR110 and 400X110A manufactured by Nihon Zeon are preferred in view of dispersion and the strength of the coating layer.

Any of polyurethane resins which are known for the binder resin can be used as the binder resin for the abrasive tape employed in the present invention.

Among the polyurethane resins, those which are 50 to 300 Kg/cm$_2$ in 100% modulus and 0° to 50° C. in glass transition temperature (Tg) are preferred in view of performance for holding the abrasive grains in the abrasive layer and providing adequate elasticity to the coating layer.

For example, C-7209 and Pandex from Dainihon Ink K.K., N-2301, N-2302, N-2304 and N-3107 from Nippon Polyurethane K.K., UR-8200, UR-8300 and UR-8600 from Toyobo K.K. and the like are preferred. Especially those having in its molecule a polar group for promoting dispersion of the abrasive grains are preferred. From this viewpoint and from the viewpoint of dispersion and the strength of the coating layer, UR-8200, UR-8300 and UR-8600 from Toyobo K.K. are most preferred.

Any of polyisocyanate resins which are known for the binder resin can be used as the binder resin for the abrasive tape employed in the present invention. For example, the following polyisocyanates can be used. Isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use products of reactions between the above-enumerated isocyanates and polyalcohols, and dimer to decamer polyisocyanates produced from condensation of isocyanates, and products which are obtained from reactions between polyisocyanates and polyurethanes and which have isocyanate groups as terminal functional groups. Especially those having three or more isocyanate groups (—NCO) in one molecule are preferred since three-diemensional crosslinking takes place.

The polyisocyanates enumerated above should preferably have an average molecular weight falling within the range of 100 to 20,000. Such polyisocyanates are commercially available as Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone or as a mixture of two or more thereof different in curing reaction properties. In order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), catalysts, such as metal oxides and iron acetylacetonate, may be used together with the polyisocyanates. The compounds having a hydroxyl group or an amino group should preferably be polyfunctional.

Among those polyisocyanates, trifunctional polyisocyanates such as Coronate 3040 supplied by Nippon Polyurethane K.K. are especially preferable in order to increase three-dimensional crosslink density.

The following abrasive grains can be employed in the abrasive layer. Chromium oxide grains, α-alumina grains, silicon carbide grains, non-magnetic iron oxide grains, red oxide (α-iron oxide) grains, diamond grains, γ-alumina grains, α,γ-alumina grains, fused alumina grains, cerium oxide grains, corundum grains, artificial diamond grains, garnet grains, emery (major constituents: corundum and magnetite) grains, silica grains, silicon nitride grains, boron nitride grains, molybdenum carbide grains, boron carbide grains, tungsten carbide grains, titanium carbide grains which have a mean grain diameter within the range of 0.05 µm to 1 µm. One of the above-enumerated abrasive grain materials having a Mohs hardness of not less than 6 may be used alone, or two to four materials may be used in combination. The abrasive grain mixtures should be 2 to 10 in pH, and preferably 5 to 10 in pH. The abrasive grains are used as the major component of the abrasive layer.

In order to prevent electrostatic breaking due to static electricity generated between the abrasive tape and the member to be polished, it is preferred that the abrasive layer contains carbon black. As the carbon black, furnace black for rubber, thermal black for rubber, coloring black, and acetylene black can be used. The carbon black is used as a light blocking agent, a friction coefficient regulating agent, and a durability improving agent as well as an antistatic agent. Abbreviations for carbon blacks in the United States which can be employed in the abrasive layer are as follows. SAF, ISAF, IISAF, T, HAF, SPF, FF, FEF, HMF, GPF, APF, SRF, MPF, ECF, SCF, CF, FT, MT, HCC, HCF, MCF, LFF, RCF and the like. Carbon blacks which fall within D-1765-82a of United States ASTM standard can be used.

In order to effectively accomplish the object of the present invention, furnace black having a mean grain diameter satisfying the aforesaid condition is especially preferred.

The carbon black has a mean grain diameter within the range of 5 to 100 nm (as measured with an electron microscope), a specific surface area within the range of 10 $m^2/g$ to 800 $m^2/g$ (as measured with the nitrogen adsorption method), a pH value within the range of 4 to 11 (as measured with the JIS K-6221-1982 method), and a dibutyl phthalate (DBP) oil absorption within the range of 10 ml/100 g to 800 ml/100 g (as measured with the JIS K-6221-1982 method). In the present invention, in cases where the carbon black is utilized in order to decrease the surface electrical resistance of the coating film, the carbon black having a size within the range of 5 to 100 nm is employed. Also, in cases where the carbon black is utilized in order to control the strength of the coating film, the carbon black having a size within the range of 50 to 1,000 nm is employed.

The kind of the carbon black and the amount of the carbon black added are selected in accordance with the characteristics which the abrasive member is required to have. The carbon black may be subjected to surface treatment with a dispersing agent, which will be described later, or may be grafted with a resin. Carbon black part of the surface of which is graphited by raising the temperature of the oven to 2000° C. or higher while the carbon black is manufactured can also be used. As a special carbon black, hollow carbon black can also be used. In cases where the carbon black is employed in the abrasive layer, it should preferably be added in proportions within the range of 0.1 to 100 parts by weight per 100 parts by weight of the inorganic grains. In cases where the carbon black is employed in the back coating layer, it should preferably be added in proportions within the range of 20 to 400 parts by weight per 100 parts by weight of a resin which will be described later. The carbon black which can be employed in the present invention can be selected with reference to, for instance, "Carbon Black Handbook", edited by "Carbon Black Association", 1971.

Besides vinyl chloride resins, polyurethane resins and polyisocyanates, thermoplastic resins, thermosetting resins, reactive resins, electron beam-curing resins, ultraviolet-curing resins, visible light-curing resins, mildewproofing resins and mixtures of two or more of these resins can be used as the binder in the abrasive layer. However, the amount of these resins should be 50% by weight of the total binder resin at most and preferably should be not more than 25% by weight.

The thermoplastic resins, which may be used as the binder resin, generally have a softening point of 150° C. or lower, an average molecular weight within the range of approximately 10,000 to approximately 300,000, and a polymerization degree within the range of approximately 50 to approximately 2,000. The polymerization degrees of the thermoplastic resins should preferably fall within the range of approximately 200 to approximately 700. Specifically, as the thermoplastic resin, it is possible to use, for example, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, an urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a polycarbonate resin, a chlorovinyl ether-acrylic ester copolymer, an amino resin, a synthetic rubber type thermoplastic resin, or a mixture of two or more of these compounds.

Among these resins, nitrocellulose and polycarbonate are especially preferred in view of the strength of the coating layer of the abrasive layer and in view of preventing the abrasive grains falling from the abrasive layer.

The thermosetting resins or the reactive resins, which may be used as the binder resin in the abrasive layer, generally have a molecular weight of 200,000 or less when the resins take on the form of coating compositions. When the coating compositions are heated and humidified after being applied onto substrates and dried, the resins exhibit an infinite increase in the molecular weight through the condensation reactions, the addition reactions, or the like. It is preferable that the resins of these types do not soften or melt before they decompose thermally. Specifically, the thermosetting resins or the reactive resins include, for example, a phenol resin, a phenoxy resin, an epoxy resin, a polyurethane resin, a polyester resin, a polyurethane polycarbonate resin, a urea resin, a melamine resin, an alkyd resin, a silicone resin, an acrylic reactive resin (an electron beam-curing resin), an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds.

It is preferred that the thermoplastic resins, the thermosetting resins, and the reactive resins described above respectively have one to six kinds of other functional groups as well as their major functional groups and each of the other functional groups be contained in proportions within the range of $1 \times 10^{-6}$ equivalent to $1 \times 10^{-2}$ equivalent per gram of the resin in order to promote dispersion of the abrasive grains and to increase the strength of the abrasive layer. Examples of the other functional groups are acid groups, such as a carboxylic acid group (COOM), a sulfinic acid group, a sulfenic acid group, a sulfonic acid group ($SO_3M$), a phosphoric acid group (PO(OM)(OM)), a phosphonic acid group, a sulfuric acid group ($OSO_3M$), and ester groups with these acids, wherein M represents H, an alkali metal, an alkaline earth metal, or a hydrocarbon group; groups of amphoteric compounds, such as a group of an amino acid, a group of an aminosulfonic acid, a group of a sulfuric ester of amino-alcohol, a group of a phosphoric ester of amino-alcohol, a sulfobetaine form group, a phosphobetaine form group, and an alkyl betaine form group; an amino group, an imino group, an imido group, and an amido group; a hydroxyl group; an alkoxyl group; a thiol group; an alkylthio group; halogen groups, such as F, Cl, Br, and I; a silyl group; a siloxane group; an epoxy group; an isocyanato group; a cyano group; a nitrile group; an oxo group; an acryl group; and a phosphine group.

The amount of the binder per 100 parts by weight of abrasive grains in the abrasive layer should be within the range of 5 to 70 parts by weight. As the additives, dispersing agents, lubricating agents, antistatic agents, antioxidants, mildew-proofing agents, coloring agents, solvents and the like are added.

As described above, carbon black is preferable as the antistatic agent.

A prime-coating layer may be provided between the substrate and the abrasive layer in order to prevent the abrasive layer from peeling off the substrate, the abrasive grains from falling off the abrasive layer and the edge faces of the abrasive tape from being damaged.

Preferably the prime-coating layer is formed of a thermosetting resin. Polyester resins or polyurethane resins whose glass transition temperature (Tg) is in the range of −40° to 50° C. are especially preferred. From the viewpoint of increase in bonding strength of the abrasive layer and durability of the bonding strength of the abrasive layer, polyester resins having a polar functional group are preferred.

In order to reduce the friction coefficient and to prevent sticking of layers, powder lubricating agents may be added to the abrasive layer.

The amount of the powder lubricating agent should generally be in the range of 1 to 50% by weight of the abrasive grains, preferably in the range of 2 to 25% by weight and more preferably in the range of 3 to 10% by weight.

Examples of the powder lubricating agents include fine grains of inorganic materials, such as graphite, molybdenum disulfide, boron nitride, graphite fluoride, calcium carbonate, barium sulfate, silicon oxide, titanium oxide, zinc oxide, tin oxide, and tungsten disulfide; and fine grains of resins, such as an acryl-styrene resin, a benzoguanamine resin, a melamine resin, a polyolefin resin, a polyester resin, a polyamide resin, a polyimide resin, and a polyfluoroethylene resin.

In order to reduce the friction coefficient and to control the elasticity of the coating layer, various organic compound lubricating agents may be added to the abrasive layer.

The amount of the organic compound lubricating agent should generally be in the range of 0.01 to 10% by weight of the abrasive grains, and preferably in the range of 0.05 to 5% by weight.

Examples of such organic compound lubricating agent include compounds into which fluorine or silicon is introduced, such as a silicone oil (e.g., a dialkyl polysiloxane, a dialkoxy polysiloxane, a phenyl polysiloxane, or a fluoroalkyl polysiloxane) (KF96, KF69 and the like from Shinetsu Chemical), a fatty acid-modified silicone oil, a fluorine alcohol, a polyolefin (e.g., a polyethylene wax or a polypropylene), a polyglycol (e.g., ethylene glycol or a polyethylene oxide wax), a tetrafluoroethylene oxide wax, a polytetrafluoroglycol, a perfluoroalkyl ether, a perfluorofatty acid, a perfluorofatty acid ester, a perfluoroalkylsulfuric ester, a perfluoroalkylsulfonic ester, a perfluoroalkylbenzenesulfonic ester, and a perfluoroalkylphosphoric ester; organic acids and organic acid ester compounds, such as an alkylsulfuric ester, an alkylsulfonic ester, an alkylphosphonic triester, an alkylphosphonic monoester, an alkylphosphonic diester, an alkylphosphoric ester, and a succinic ester; heterocyclic compounds containing nitrogen or sulfur, such as triazaindolizine, tetraazaindene, benzotriazole, benzotriazine, benzodiazole, and EDTA; a fatty acid ester of a monobasic fatty acid having 10 to 40 carbon atoms with at least one or more of a monohydric alcohol, a dihydric alcohol, a trihydric alcohol, a tetrahydric alcohol and a hexahydric alcohol having 2 to 40 carbon atoms; a fatty acid ester of a monobasic fatty acid having at least 10 carbon atoms with such an monohydric, dihydric, trihydric, tetrahydric, pentahydric or hexahydric alcohol that the sum of the number of the carbon atoms of the fatty acid and the number of the carbon atoms of the alcohol falls within the range of 11 to 70; and fatty acids, fatty acid amides, fatty acid alkyl amides, and aliphatic alcohols having 8 to 40 carbon atoms.

Such an organic compound lubricating agent may, for example, be butyl caprylate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkyl amide, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, or carnauba wax. Each of these organic compound lubricating agents may be used alone or in combination with one or more of the others.

The abrasive layer may further contain antioxidants (e.g., metal chelating agents, such as an alkyl phenol, benzotriazine, tetraazaindene, sulfamide, guanidine, nucleic acid, pyridine, amine, hydroquinone, and EDTA), rust preventives (e.g., naphthenic acid, alkenylsuccinic acid, phosphoric acid, and dilauryl phosphate), oiliness improvers (e.g., colza oil and lauryl alcohol), extreme pressure additives (e.g., dibenzyl sulfide, tricresyl phosphate, and tributyl phosphite), detergent-dispersants, viscosity index improvers, pour point depressants, and foaming preventives. These additives are added in proportions falling within the range of 0.01 to 30 parts by weight per 100 parts by weight of the binder.

These additives are described, for instance, in "IBM Technical Disclosure Bulletin", Vol. 9. NO.7, p779, December 1966; "ELEKTRONIC", No.12, p380, 1961; and "Chemical Handbook, Application", pp 954 to 967, 1980 published from MARUZEN.

In order to promote dispersion of the abrasive grains, a dispersing agent and/or dispersion assisting auxiliary may be added to the abrasive layer. As the dispersing agents and dispersion assisting auxiliaries, it is possible to employ fatty acids having 2 to 40 carbon atoms ($R_1COOH$, wherein $R_1$ represents an alkyl group, a phenyl group, or an aralkyl group, which has 1 to 39 carbon atoms), such as caprylic acid, capric acid, lauric acid, myristic acid, palmitic acid, stearic acid, oleic acid, elaidic acid, linoleic acid, linolenic acid, stearolic acid, behenic acid, maleic acid, and phthalic acid; metallic soaps (e.g., copper oleate) obtained from the above-enumerated fatty acids and alkali metals (Li, Na, K, $NH^4+$ and the like), alkaline earth metals (Mg, Ca, Ba, and the like), Cu, or Pb; fatty acid amides; and lecithins (e.g., soybean oil lecithin). As the dispersing agents and dispersion assisting auxiliaries, it is also possible to employ higher alcohols having 4 to 40 carbon atoms (e.g., butyl alcohol, octyl alcohol, myristyl alcohol, and stearyl alcohol), sulfuric esters of these higher alcohols, sulfonic acid, phenylsulfonic acids, alkylsulfonic acids, sulfonic esters, phosphoric monoesters, phosphoric diesters, phosphoric triesters, alkylphosphonic acids, phenylphosphonic acids, and amine compounds. As the dispersing agents and dispersion assisting auxiliaries, it is further possible to employ polyethylene glycols, polyethylene oxides, sulfosuccinic acid, sulfosuccinic acid metal salts, and sulfosuccinic esters. Ordinarily, one or more kinds of the dispersing agents are employed. One kind of the dispersing agent is added in proportions falling within the range of 0.005 to 20 parts by weight per 100 parts by weight of the binder. When the dispersing agent is used, it may be adhered to the surfaces of the ferromagnetic fine grains and/or the non-magnetic fine grains or may be added during the dispersion process.

Examples of the mildew-proofing agents, which may be employed in the abrasive layer, include 2-(4-thiazolyl)-benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroacetic acid, mercury phenyloleate, bis(tributyltin) oxide, and salicylanilide. The mildew-proofing agents are described in "Microbial Disasters and Technology of Inhibiting the same" from "Kougaku Tosho", 1972, "Chemistry and Industry"32, 904 (1979), and the like.

Examples of the antistatic agents other than carbon black, which may be employed in the abrasive layer, include conductive grains, such as graphite grains, modified graphite grains, carbon black graft polymer grains, tin oxide-antimony oxide grains, tin oxide grains, and titanium oxide-tin oxide-antimony oxide grains; natural surface active agents, such as saponin; nonionic surface active agents, such as an alkyleneoxide compound, a glycerin compound, a glycidol compound, a polyhydric alcohol, a polyhydric alcohol ester, and an adduct of an alkyl phenol with ethylene oxide; cationic surface active agents, such as a higher alkylamine, a cyclic amine, a hydantoin derivative, an amidoamine, an ester amide, a quaternary ammonium salt, a heterocyclic compound, e.g. pyridine, a phosphonium compound, and a sulfonium compound; anionic surface active agents containing acidic groups, such as a carboxylic acid group, a sulfonic acid group, a phosphonic acid group, a phosphoric acid group, a sulfuric ester group, a phosphonic ester group, and a phosphoric ester group; and amphoteric surface active agents, such as an amino acid, an amino sulfonic acid, a sulfate or a phosphate of an amino alcohol, and an alkyl betaine compound. A part of the surface active agents are also described in "Synthesis of Surface Active Agents and Application of the same" from Maki Shoten, 1972; "Surface Active Agents" from Interscience Publication Corporated, 1985; "Encyclopedia of Surface Active Agents" Vol. 2 from Chemical Publish Company, 1964; "Surface Active Agent Handbook" sixth edition from Sangyou Tosho Kabusikigaisha, Dec., 20, 1966; "Antistatic Agents" from Saiwai Shobou, 1968; and the like. Each of such surface active agents may be added alone or in a mixture of one or more of the others. In cases where the surface active agent is employed in the abrasive layer, it may be added in proportions within the range of 0.01 to 10 parts by weight per 100 parts by weight of the abrasive grains and/or the ferromagnetic fine grains. In cases where the surface active agent is employed in the back coating layer, it may be added in proportions within the range of 0.01 to 30 parts by weight per 100 parts by weight of the binder. The surface active agents may also be used for purposes other than as the antistatic agents, for example, for dispersion, for improvement of magnetic characteristics, for improvement of lubricating properties, as coating assisting auxiliaries, as wetting agents, as hardening accelerators, and as dispersion accelerators.

In the present invention, organic solvents may be used in any proportion during the dispersing, kneading, and coating processes for the coating composition which is used to form the abrasive layer or the back coating layer. Examples of such organic solvents include ketones, such as acetone, methyl ethyl ketone, methyl isobutyl ketone, cyclohexanone, isophorone, and tetrahydrofuran; alcohols, such as methyl alcohol, ethyl alcohol, propyl alcohol, butyl alcohol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, ethylene glycol dimethyl ether, ethylene glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, and hexane. Ordinarily, two or more of the above-enumerated organic solvents are used in combination in arbitrary proportions. The organic solvents may contain small amounts of impurities (e.g., polymerization products of the organic solvents, moisture, and raw material constituents of the organic solvents) in proportions of not larger than 1% by weight.

Ordinarily, the organic solvents are used in proportions within the range of 100 to 20,000 parts by weight per 100 parts by weight of the total solids of the coating composition for the abrasive layer, or the prime-coating composition. The solid contents of the coating composition should preferably fall within the range of 1% by weight to 40% by weight.

When the abrasive layer is to be formed, the constituents described above are selected appropriately and dispersed or dissolved in the organic solvents, and a coating composition is thereby prepared. The coating composition is applied onto the flexible substrate and dried. The substrate of the abrasive tape is preferably 2.5 to 500 microns in thickness and more preferably 3 to 75 microns in thickness. Further it is preferred that the Young's modulus of the substrate in either one of the longitudinal direction and the transverse direction be not lower than 400 kg/mm$^2$. Examples of the materials for the substrate include polyesters, such as a polyethylene terephthalate and a polyethylene naphthalate; polyolefins, such as a polypropylene; cellulose derivatives, such as cellulose triacetate and cellulose diacetate; vinyl resins, such as a polyvinyl chloride; plastic materials, such as a polycarbonate, a polyimide, a polyamide, a polysulfone, a polyphenylsulfone, and a polybenzoxazole; metals, such as aluminum and copper; and ceramic materials, such as glass. Among the above-enumerated materials, the polyethylene naphthalate and the polyamide are preferable. Before the coating composition is applied onto the flexible substrate, the flexible substrate may be subjected to corona discharge treatment, plasma treatment, prime-coating treatment, heat treatment, dust-resistant treatment, metal vapor evaporation treatment, and/or alkali treatment. There are descriptions on the substrate for the abrasive tape, for instance, in West German Patent No. 3338854A, Japanese Unexamined Patent Publication Nos. 59(1984)-116926 and 61(1986)-129731, U.S. Pat. No. 4388368, and "Fibers and Industry" by Yukio Mitsuishi, Vol. 31, pp50 to 55, 1975. The center line average surface roughness of the substrate is preferably 0.01 to 1.5 μm (cut-off value of 0.25 mm).

No limitation is imposed on how the dispersion and kneading processes are carried out. The order, in which the constituents (the resins, the grains, the lubricants, the solvents, and the like) are added, the timing, with which the constituents are added during the dispersion and kneading processes, the temperature at which the dispersion process is carried out (and which will ordinarily fall within the range of 0° C. to 80° C.), and the like, may be selected appropriately. One of various types of kneading machines may be used in order to prepare the coating composition for the abrasive layer. For example, it is possible to use a twin roll mill, a triple roll mill, a ball mill, a pebble mill, a trommel, a sand grinder, a Szegvari attritor, a high-speed impeller, a dispersing machine, a high-speed stone mill, a high-speed impact mill, a disperser, a kneader, a high-speed mixer, a ribbon blender, a Ko-kneader, an intensive mixer, a tumbler, a blender, a homogenizer, a single-screw extruder, a twin-screw extruder, or an ultrasonic dispersing machine. Normally, dispersion and kneading processes are continuously carried out using a plurality of dispersing and kneading machines. The dispersion and kneading is described in detail, for instance, in "Paint Flow and Pigment Dispersion" by T. C. Patton published from John Wiley & Sons, 1964, "Industrial Material" Vol. 25, 37, 1977, by Shinichi Tanaka and the literature cited therein. In order to efficiently carry out the dispersion and kneading, ancillary materials such as steel balls, steel beads, ceramic beads, glass beads, organic polymer beads and the like having a sphere-equivalent diameter of 10 cmφ to 0.05 mmφ can be used, though they need not be spherical. The dispersion and kneading is described also in U.S. Pat. Nos. 2,581,414, 2,855,156 and the like. In this invention, the coating compositions for the abrasive layer and the back coating layer can be prepared according to the methods shown in the books, the literature cited in the books, and the patent publications.

When the coating composition for the abrasive layer is to be applied onto the substrate, the viscosity of the coating composition may be adjusted at a value falling within the range of 1 to 20,000 centistokes at 25° C. The coating composition may be applied onto the substrate by using any of coating apparatuses, for example, an air doctor coater, a blade coater, an air-knife coater, a squeeze coater, an impregnation coater, a reverse-roll coater, a transfer roll coater, a gravure coater, a kiss-roll coater, a cast coater, a spray coater, a rod coater, a forward-rotation roll coater, a curtain coater, an extrusion coater, a bar coater, or a lip coater. See, for example, "Coating Engineering" pp. 253 to 277, Mar. 20, 1971, Asakura Shoten. The coating compositions may be applied in any order. A prime coating layer may be applied to the substrate before application of the respective coating compositions, and the substrate may be subjected to corona discharge treatment before application of the respective coating compositions in order to enhance bonding force of the coating to the substrate. When the abrasive layer and/or back coating layer is to be formed of a plurality of layers, the layers may be applied to the substrate at one time or in sequence. See, for instance, Japanese Patent Publication No. 62(1987)-37451 and Japanese Unexamined Patent Publication Nos. 57(1982)-123532, 59(1984)-142741 and 59(1984)-165239.

The coating composition applied to the substrate in a thickness of about 1 to 100 μm in the manner described above is immediately subjected to multistage drying treatment at 20° to 130° C. The abrasive layer thus formed is dried into a thickness of 0.1 to 10 μm. Normally the substrate is transferred at a speed of 10 to 900 m/min and the drying temperature in the respective drying zones is controlled to 20° to 130° C. so that the amount of residual solvent in the applied film becomes 0.1 to 40 mg/m$^2$. If necessary, the back coating layer is formed in the similar manner. Thereafter the layers are subjected to surface smoothing treatment to a centerline mean surface roughness of 0.001 to 0.3 microns (cut-off 0.25 mm) and then the web is cut into a desired shape. It is preferred that the pretreatment and the surface treatment of the grains, the kneading and dispersion, the application, orientation and drying, smoothing, heat treatment, EB treatment, surface cleaning, cutting and take-up be carried out continuously.

The abrasive tape web which has been prepared in the manner described above is cut into abrasive tapes, and each abrasive tape is wound around a desired plastic or metal reel. Before or immediately before the abrasive tape is wound around the reel, the abrasive tape (specifically, the abrasive layer surface, the back coating layer surface, the edge surfaces, and/or the base surface on the back side) should preferably be burnished and/or cleaned. The burnishing process is carried out in order to adjust the surface roughness and the polishing performance of the abrasive tape. Specifically, protrusions on the surface of the abrasive tape are scraped out, and the surface of the abrasive tape is thereby made uniform or smooth by using a hard material, such as a sapphire blade, a shaving blade, a super-hard material blade, a diamond blade, or a ceramic blade. No limitation is imposed on the hardness of the material used for the burnishing process, and any of materials, which can remove protrusions on the surface of the abrasive tape, may be employed. However, the Mohs hardness of the material used for the burnishing process should preferably be 8 or higher. The materials need not necessarily take on the form of blades and may have other shapes, such as square, round, and wheel shapes. (The material may be provided on the circumferential surface of a rotatable cylinder.) The cleaning process is carried out in order to remove foreign substances, excessive lubricating agents, and the like, from the surface of the abrasive tape. For this purpose, the abrasive layer surface, the back coating layer surface, the edge surfaces, and the base surface on the back side are wiped with a nonwoven fabric, or the like. As the wiping materials, it is possible to use, for example, various Vilene products supplied by Japan Vilene Co., Ltd., Toraysee and Ecsaine supplied by Toray Industries, Inc., a material available as Kimwipe (trade name), a nylon unwoven fabric, a polyester unwoven fabric, a rayon unwoven fabric, an acrylonitrile unwoven fabric, a mixed unwoven fabric, and tissue paper.

As for the abrasive grains, the binders, the additives (such as lubricating agents, dispersing agents, antistatic agents, surface treatment agents, carbon black, light blocking agents, antioxidants, and mildew-proofing agents), the solvents, and/or substrates (which may be provided with a prime-coating layer, a back coating layer, and a back prime-coating layer), which may be utilized for the abrasive tape, and how to prepare these constituents, reference may be made to, for example, the method for making a magnetic recording medium, which is disclosed in Japanese Patent Publication No. 56(1981)-26890.

The present invention will further be illustrated by the following non-limitative examples. In these examples, the term "parts" means parts by weight.

EXAMPLES 1 AND 2 AND CONTROLS 1 TO 5

A prime-coating layer constituted of a polyester polyurethane resin was applied to a thickness of 0.1 μm onto a plurality of polyethylene terephthalate substrates 25 μm in thickness and 300 mm in width. Abrasive coating compositions were prepared from the constituents described below, and the abrasive coating compositions were applied with a bar coating process onto the prime-coating layer such that the dry thickness of the abrasive layer might be 10 μm. After dried, the abrasive web thus formed was slit into various widths. In this manner, various samples of abrasive tapes were prepared.

| Abrasive coating composition: | |
|---|---|
| Abrasive grains (alumina) (granular, mean grain diameter: 0.1 μm, Mohs hardness: 9) | 95 parts |
| Abrasive grains (diamond) (granular, mean grain diameter: 0.5 μm, Mohs hardness: 10) | 5 parts |
| Binder (polyester resin) | 10 parts |
| Binder (polyurethane resin) (containing sodium sulfonate in a proportion of $2 \times 10^{-3}$ equivalent per g of the resin, Mw: 70,000) | 10 parts |
| Binder (polyisocyanate) (a reaction product of 3 mols of tolylene diisocyanate with 1 mol of trimethylolpropane) | 5 parts |
| Dispersing agent (copper oleate/phthalocyanine dye = 1/1) | 0.1 part |
| Lubricating agent (oleic acid/oleic acid oleyl) | 0.1 part |
| Diluting agent (methyl ethyl ketone/ cyclohexanone = 2/1) | 200 parts |
| Diluting agent (toluene/MIBK) | 150 parts |
| Additive (carbon black) | 3 parts |

Projections on color filters were polished with the abrasive tape thus obtained under the following condition, and the result is set forth in table 1.

Polishing conditions

Number of the abrasive tapes were selected from the range of #8000 to #33000, and the color filters were polished under the condition shown in table 1.

Measurement of height of the projections

Measured according to focus depth method with an optical microscope (at 400×). The maximum values before polish were taken.

Scratches on the color filter

Investigated through an optical microscope. ○ indicates that substantially no scratch was found on the surface of the color filter, and X indicates that scratches were found on the surface of the color filter.

| | tape width (mm) | polishing condition | | | height of projections | | |
| | | relative speed (mm/sec) | roll ϕ (mm) | load (g) | before polish (μm) | after polish (μm) | |
|---|---|---|---|---|---|---|---|
| example 1 | 8 | 1500 | 10 | 100 | 20 | 3 | ○ |
| example 2 | 20 | 1500 | 10 | 100 | 20 | 3 | ○ |
| control 1 | 300 | 1500 | 10 | 100 | 20 | 19 | X |
| control 2 | 8 | 0 | 10 | 100 | 20 | 20 | ○ |
| control 3 | 8 | 1500 | 2 | 100 | 20 | 10 | X |

-continued

| | tape width (mm) | polishing condition | | | height of projections | | |
| --- | --- | --- | --- | --- | --- | --- | --- |
| | | relative speed (mm/sec) | roll φ (mm) | load (g) | before polish (μm) | after poish (μm) | |
| control 4 | 8 | 1500 | 10 | 2 | 20 | 20 | ○ |
| control 5 | 8 | 1500 | 10 | 1000 | 20 | 3 | X |

EXAMPLES 3 TO 7 AND CONTROLS 6 TO 10

A prime-coating layer constituted of a polyester polyurethane resin was applied to a thickness of 0.5 μm onto a plurality of polyethylene terephthalate substrates 25 μm thick. Abrasive coating compositions were prepared from the constituents described below, and the abrasive coating compositions were applied with a bar coating process onto the prime-coating layer such that the dry thickness of the abrasive layer might be 3 μm. After dried, the abrasive web thus formed was slit into 12.65 mm wide. In this manner, samples of abrasive tapes were prepared.

| Abrasive coating composition: | |
| --- | --- |
| Abrasive grains (alumina) (granular, mean grain diameter: A μm (see table 2), Mohs hardness: 9) | 100 parts |
| Binder (vinyl chloride resin) | X parts (see table 2) |
| Binder (polyurethane resin) (containing sodium sulfonate in a proportion of 2 × 10$^{-3}$ equivalent per g of the resin, Mw: 70,000) | Y parts (see table 2) |
| Binder (polyisocyanate) (a reaction product of 3 mols of tolylene diisocyanate with 1 mol of trimethylolpropane) | Z parts (see table 2) |
| Carbon black (black EC) | B parts (see table 2) |
| Lubricating agent (oleic acid/oleic acid oleyl) | 0.1 part |
| Diluting agent (methyl ethyl ketone/ cyclohexanone = 2/1) | 200 parts |
| Diluting agent (toluene/MIBK) | 150 parts |

Projections on color filters were polished with the abrasive tape thus obtained under the same condition as that described above, and the result is set forth in table 3.

TABLE 2

| | mean grain size A (μm) | B (parts of carbon black) | X (parts of VC resin) | Y (parts of PU resin) | Z (parts of PI resin) |
| --- | --- | --- | --- | --- | --- |
| example 3 | 0.4 | 2 | 0 | 10.5 | 4.5 |
| example 4 | 0.4 | 2 | 0 | 14.3 | 0.7 |
| example 5 | 0.4 | 2 | 1.5 | 10.5 | 3.0 |
| control 6 | 0.4 | 2 | 3 | 7.5 | 4.5 |
| control 7 | 0.4 | 2 | 0 | 15.0 | 0.0 |
| control 8 | 1.2 | 2 | 0 | 10.5 | 4.5 |
| example 6 | 0.1 | 2 | 0 | 10.5 | 4.5 |
| example 7 | 0.05 | 2 | 0 | 10.5 | 4.5 |
| control 9 | 0.01 | 2 | 0 | 10.5 | 4.5 |
| contrpol 10 | 0.4 | 2 | 0 | 10.5 | 4.5 |

Electrostatic breaking and corrosion were evaluated in the following manner.
Electrostatic breaking
The charge at the portion of the surface of the abrasive tape just after polishing was measured during polishing by TRECK manufactured by TRECK Co. ○ indicates that the charge was −10 to +10 mV, and X indicates that the charge was not higher than −11 mV or higher than 11 mV.
Corrosion
The polished color filters were left to stand for 30 days under the condition of 50° C. 90% RH, and liquid crystal displays were produced with the color filters. Then a voltage was applied to each liquid crystal display and corrosion of the color filter element was investigated. ○ indicates that shortcircuiting was not found, and X indicates that shortcircuiting was found at least one part.

|  | height of projections | | scratches of | | |
|---|---|---|---|---|---|
|  | before polish (μm) | after polish (μm) | electrostatic breaking | the C/F surface | corrosion |
| example 3 | 20 | 4 | ○ | ○ | ○ |
| example 4 | 20 | 5 | ○ | ○ | ○ |
| example 5 | 20 | 6 | ○ | ○ | ○ |
| control 6 | 20 | 4 | ○ | ○ | X |
| control 7 | 20 | 20 | ○ | ○ | ○ |
| control 8 | 20 | 4 | ○ | X | ○ |
| example 6 | 20 | 6 | ○ | ○ | ○ |
| example 7 | 20 | 8 | ○ | ○ | ○ |
| control 9 | 20 | 20 | ○ | ○ | ○ |
| control 10 | 20 | 5 | X | ○ | ○ |

As can be understood from the description above, the intrinsic projections can be removed from a surface without scratching surface by polishing the surface in accordance with the method of the present invention. Especially the color filter for a liquid crystal display can be polished with a high yield. Further by selecting the binder component of the abrasive tape, corrosion and/or shortcircuiting in the color filter can be prevented.

What is claimed is:

1. A method of polishing a surface of a member having intrinsic projections thereon to remove the intrinsic projections, characterized in that an abrasive tape comprising a substrate and an abrasive layer formed thereon and said member are slid in substantially opposite directions with the abrasive layer and the surface of the member kept in contact with each other, the abrasive layer primarily containing abrasive grains and a binder, in which said member is a color filter for a liquid crystal display;

and in which said binder of the abrasive layer is composed of an urethane resin and a polyisocyanate, and the proportion of the urethane resin: the polyisocyanate is in the range of 60 to 95:5 to 40 in % by weight.

2. A method as defined in claim 1, wherein the distance between the abrasive tape and the minima of the intrinsic projections of the member is 1 to 5 μm, and the abrasive tape is pressed against the member at a pressing load of 5 to 500 g per 12.5 mm.

* * * * *